United States Patent
Livermore et al.

(10) Patent No.: US 6,930,814 B2
(45) Date of Patent: Aug. 16, 2005

(54) CALIBRATING VOLTAGE CONTROLLABLE OPTICAL COMPONENTS IN COMMUNICATION SYSTEMS

(75) Inventors: Peter James Livermore, Beeston (GB); Graham Butler, Chilwell (GB); Michael Leach, Awsworth (GB); Darren Vass, Long Eaton (GB)

(73) Assignee: Marconi UK Intellectual Property Ltd., Coventry (GB)

( * ) Notice: Subject to any disclaimer, the term of this patent is extended or adjusted under 35 U.S.C. 154(b) by 0 days.

(21) Appl. No.: 10/467,548

(22) PCT Filed: Feb. 1, 2002

(86) PCT No.: PCT/GB02/00433

§ 371 (c)(1),
(2), (4) Date: Feb. 9, 2004

(87) PCT Pub. No.: WO02/063381

PCT Pub. Date: Aug. 15, 2002

(65) Prior Publication Data

US 2004/0114846 A1 Jun. 17, 2004

(30) Foreign Application Priority Data

Feb. 8, 2001 (GB) .............................. 0103072

(51) Int. Cl.[7] .................. G02B 26/00; G02B 6/26; G02F 1/03; G02F 1/035; G02F 1/295
(52) U.S. Cl. ................ 359/239; 359/237; 359/245; 385/2; 385/8; 385/39
(58) Field of Search ............................ 359/237, 239, 359/245, 579, 240; 385/1–3, 8–10, 39–41, 42; 398/38, 25, 94

(56) References Cited

U.S. PATENT DOCUMENTS 5,149,953 A 9/1992 Erwin
5,521,749 A 5/1996 Kawashima
5,907,426 A 5/1999 Kato et al.
6,222,965 B1 4/2001 Smith
6,317,247 B1 11/2001 Yang et al.
6,396,632 B1 * 5/2002 Liu et al. .................... 359/579

FOREIGN PATENT DOCUMENTS

EP  0 448 832 A2  10/1991
WO  WO 99/54677  10/1999

* cited by examiner

*Primary Examiner*—Georgia Epps
*Assistant Examiner*—Jack Dinh
(74) *Attorney, Agent, or Firm*—Kirschstein, et al.

(57) ABSTRACT

A method of, and apparatus for, setting an operating (control) voltage of a voltage controllable optical component, such as a Mach-Zehnder optical modulator, having a periodic voltage/optical parameter (optical power) characteristic include an up/down counter and a digital to analog converter operable to set the voltage applied to the component to a predetermined initial value, a device for measuring the optical parameter, and another device for sequentially progressively increasing and decreasing the voltage (incrementing/decrementing the counter) with respect to the predetermined value, and for determining respective voltage values which produce maximum and minimum values of the optical parameter. The voltage is set to a value intermediate the maximum and minimum voltage values. Further, the apparatus determines the sense of the slope of that portion of the periodic characteristic lying between the maximum and minimum values for use by a control loop during subsequent operation of the optical component.

11 Claims, 2 Drawing Sheets

CALIBRATING VOLTAGE CONTROLLABLE OPTICAL COMPONENTS IN COMMUNICATION SYSTEMS

BACKGROUND OF THE INVENTION

This invention relates to a method of, and apparatus for, setting an operating of a voltage controllable optical components in communication systems. More especially, although not exclusively, the invention concerns optical modulators such as Mach-Zehnder interferometers and in particular such interferometers fabricated in Lithium Niobate.

A Lithium Niobate ($LiNbO_3$) Mach-Zehnder Interferometer, hereafter known as an Mz device, is a voltage controlled optical attenuator having a optical attenuation/voltage characteristic which is periodic. Its use is primarily directed towards DWDM (dense wavelength division multiplexing) applications where collections of precisely controlled optical wavelengths (often termed wavelength channels) are transmitted through long-haul optical fibres. Such arrangements permit a single optical fibre to carry digital data at extremely high bandwidths. The MZ device, when inserted into the optical path at the output from the transmit laser, can be used to provide two differing functions:

i. To accurately control the optical power level of a particular wavelength.

ii. To modulate the optical signal with high-speed digital data.

From a control point of view, both functions are virtually identical. The only notable difference is that a MZ device used for modulation usually has two differential input signals. One carries the high-speed data while the other is used to set the bias point of the device. The present invention is relevant to both functions i and ii above. In the case of ii, however, it is the biasing aspect that is of particular interest.

FIG. 1 shows a block diagram illustrating the principle of operation of a MZ device. Light (optical radiation) enters the MZ device from an optical fibre cable and is split into two paths at S. Half the incident optical power passes through each path. Light passing along each path experiences a respective delay that is introduced by a slab of Lithium Niobate ($LiNbO_3$). By applying an electric field, the result of external control voltages V1 and V2, to the $LiNbO_3$ the delay can be varied. Light which has travelled along the two paths, each of which has experienced a potentially delay, is combined at C before being fed to the outgoing fibre cable.

It can be shown that ratio of output amplitude to input amplitude varies with the differential delay between the two paths. If this delay is $\tau$ and the angular frequency of the particular optical wavelength is $\omega$ then:

Amplitude ratio=output amplitude/input amplitude=$0.7071 (1+\cos(\omega\tau))^{0.5}$ It follows that the corresponding power ratio (i.e. output power/input power) is a raised cosine response:

power ratio=$\frac{1}{2}(1+\cos(\omega\tau))$

If one control voltage is fixed and the other one varied V (ignoring imperfections and non-linearities) it can be shown that:

Power ratio=$\frac{1}{2}(1+\cos(\pi(V-V_0)/V\pi))$

Where $V\pi$ and $V_0$ are constants. $V\pi$ represents the voltage difference between successive peaks and troughs of output power and $V_0$ represents a control voltage which results in maximum output power. Although $V_0$ is multi-valued, the value nearest to zero volts is usually quoted.

FIG. 2 shows a graph illustrating the variation of power ratio with applied control voltage V; the V-P characteristic. It should be noted that the calibration of the Y-axis is linear with respect to power. It will be further appreciated that the variation of normalised optical attenuation versus control voltage (voltage/optical attenuation characteristic) is the reciprocal of that in FIG. 2 such that when the control voltage=$V_0$, the power ratio is at a maximum value whilst optical attenuation is correspondingly at a minimum value.

As shown above, constants $V_0$ and $V\pi$ are the key to controlling an MZ device. Unfortunately, these so-called constants are in practice variables which depend upon:

i. Manufacturing tolerances (their post-manufacture values are difficult to control).

ii. Ageing (their values drift with age).

iii. Environmental conditions (such as temperature).

Any control circuit which is designed to maintain some specified output power level therefore needs to perform the following conceptual steps:

(a) Measure the power level at the output fibre (P).

(b) Compare (P) with the required value (which may be variable).

(c) Adjust the control voltage (V) so as to bring P towards the required power.

Step (c) requires a knowledge of the sign of the "V-P characteristic" slope so that the feedback loop can apply an error correction signal which counteracts the unwanted change in output. Should the control voltage stray beyond the bounds of the chosen $\pi$ segment (i.e. $V_\pi$) of the characteristic then the control mechanism is likely to fail because positive feedback will then exist, leading to an increase in the error. Even a transient variation in the control voltage, caused by for example a noise transient, could be sufficient to do this. The control loop will then run away until the next $\pi$ segment is reached, when negative feedback will again be restored. However, operation in a $\pi$ segment remote from the $\pi$ segment closest to V=0 means that the device is operated using an unnecessarily high voltage, leading to greater electrical strain, increased instability and possibly a shorter operating life. The only option would then be to set the control voltage V to some initial condition and then re-enable the control loop.

It is therefore necessary to calibrate the device to determine an acceptable initial condition for the control voltage V which would guarantee starting the control loop within the chosen $\pi$ segment of the characteristic and which is suitably clear of the turning points of the V-P (voltage/optical attenuation) characteristic.

SUMMARY OF THE INVENTION

According to a first aspect of the invention there is provided an apparatus for setting an operating voltage of a voltage controllable optical component having a periodic voltage/optical parameter characteristic the apparatus being characterised by: means operable to set the voltage applied to the component to a predetermined initial value; means for measuring the optical parameter, means for sequentially progressively increasing and decreasing the voltage with respect to the predetermined value and means for determining respective voltage values which produce maximum and minimum values of the optical parameter; means for determining the sense of the slope of that portion of the periodic characteristic lying between the said maximum and minimum values; and wherein the means operable to set the voltage sets the voltage to a value intermediate the maximum and minimum voltage values.

Advantageously when the optical component is used in a communications system to convey communications traffic the apparatus further comprises means to detect for the absence of communications traffic and in response to the detection of the absence of traffic, to cause the apparatus to set the operating voltage of the component.

The present invention finds particular application where the voltage controllable optical component is an optical modulator and the optical parameter is optical attenuation/optical power. Most preferably the voltage controllable optical component is a Mach-Zehnder interferometer, preferably a lithium niobate interferometer.

According to a second aspect of the invention there is provided a communications system incorporating apparatus as described above.

According to a further aspect of the invention there is provided a method of setting an operating voltage of a voltage controllable optical component having a periodic voltage/optical parameter characteristic, the method being characterised by: setting a voltage applied to the component to a predetermined initial value; measuring the optical parameter; sequentially progressively increasing and decreasing the voltage with respect to the predetermined value and determining respective voltage values which produce maximum and minimum values of the optical parameter; determining the sense of the slope of that portion of the periodic characteristic lying between the said maximum and minimum values; and setting the voltage to a value intermediate the maximum and minimum voltage values.

Advantageously when the optical component is used in a communications system to convey communications traffic the method further comprises detecting for the absence of communications traffic and in response to the detection of the absence of traffic setting the operating voltage of the component. Preferably the voltage controllable optical component is an optical modulator and the optical parameter is optical attenuation or optical power. Most preferably the voltage controllable optical component is a Mach-Zehnder interferometer, preferably a lithium niobate interferometer.

BRIEF DESCRIPTION OF THE DRAWINGS

Embodiments of the invention will now be described, by way of non-limiting example only, with reference to the drawings in which.

DETAILED DESCRIPTION OF THE PREFERRED EMBODIMENTS

Figure 1:
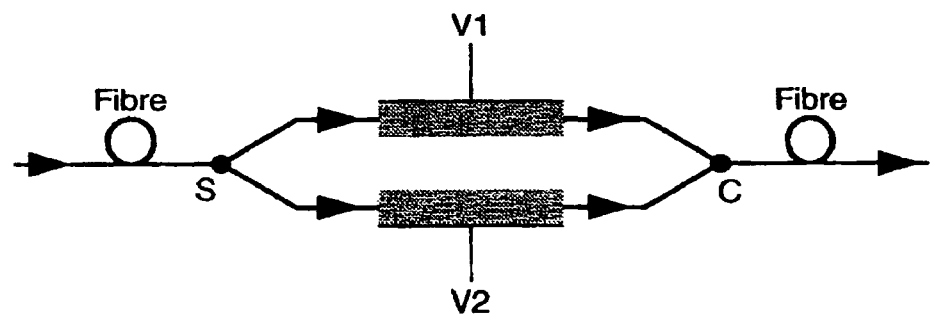
FIG. 1 is a schematic representation of a known Mach-Zehnder intererometer.
Figure 2:
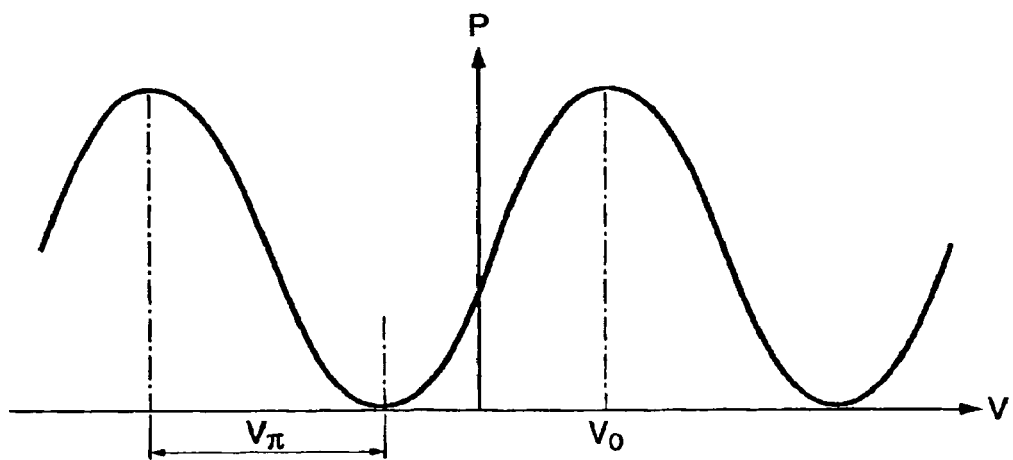
FIG. 2 is a schematic of the voltage/optical attenuation characteristic of the interferometer of FIG. 1.
Figure 3:
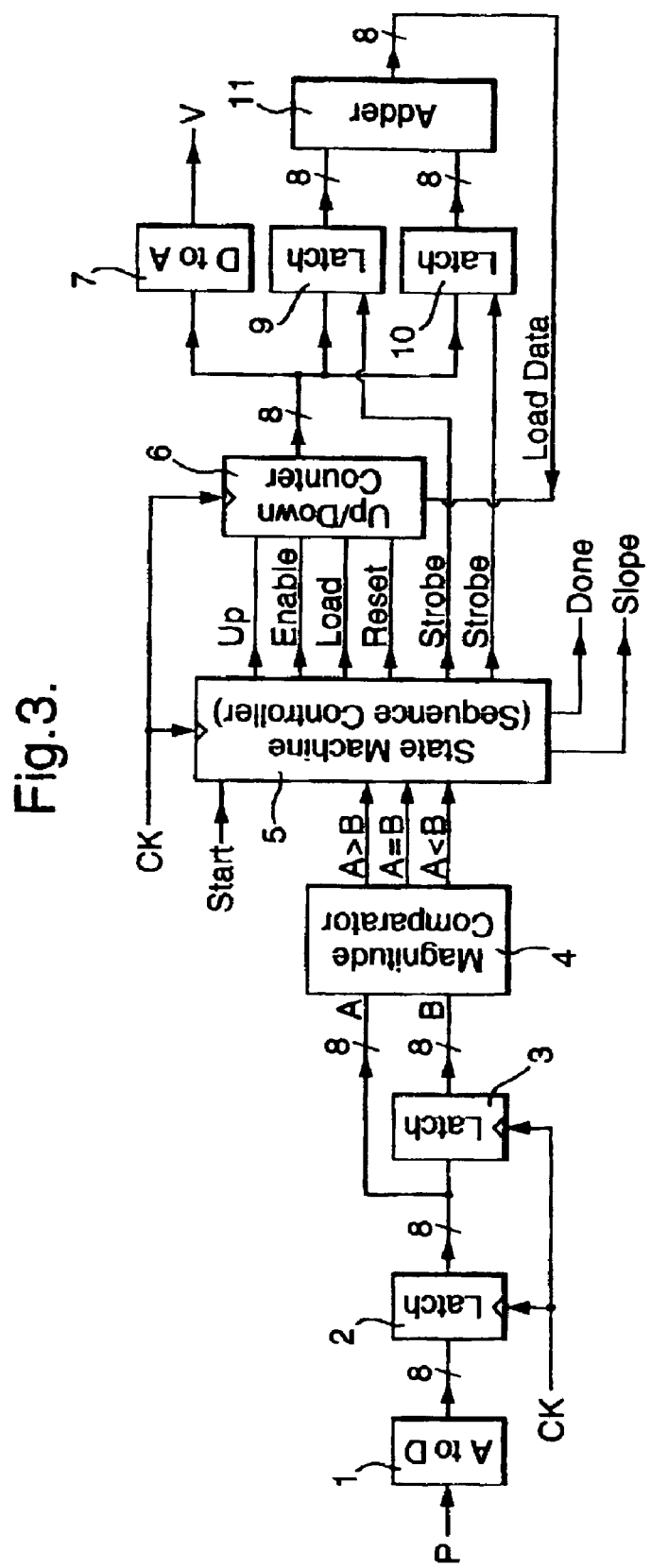
FIG. 3 is a block diagram of a circuit in accordance with the invention for calibrating a voltage controllable optical component such a Mach Zehnder optical modulator.

Referring to FIG. 3 there is a circuit in accordance with the invention for calibrating/operating a lithium niobate Mach-Zehnder optical modulator (interferometer). The circuit provides a self calibrating mechanism which will determine values for $V_0$ and $V_\pi$ whenever the need arises. Such occasions where the calibration of the control voltage are required include:

on initial power-up of the circuitry;

whenever the power control loop fails for any reason;

whenever the laser is turned on after a controlled shutdown;

on a periodic basis whenever the circuit is not carrying traffic; or manually, for test purposes.

This self calibrating mechanism performed by the circuit comprises the following steps:

1. Set V=0 and record the optical output power ($P_0$).
2. Set $V=V+\Delta V$ and record the new optical power ($P_{\Delta V}$).
3. If $P_{\Delta V} < P_0$ then go to step 8.
4. Keep increasing V by an amount $\Delta V$ until a maximum optical power is reached. Record $V_0$=the current value of V.
5. Set V=0.
6. Keep decreasing V by an amount $\Delta V$ until a minimum optical power is reached. Record $V_\infty$=the current value of V.
7. Exit procedure.
8. Keep decreasing V by $\Delta V$ until a maximum optical power is reached. Record $V_0$=the current value of V.
9. Set V=0.
10. Keep increasing V by an amount $\Delta V$ until a minimum optical power is reached. Record $V_\infty$=the current value of V.

The value of $V_0$ has already been determined from the above method. $V_\pi$ is determined from the modulus of $(V_0-V_\infty)$ and the polarity of the slope of the "P-V characteristic" is determined from the sign of $V_0$. It is found that a good initial condition for the value of V is given by the mid-point of the slope, namely:

$$V=(V_0+V_\infty)/2.$$

Referring to FIG. 3 the measured optical output power P is applied to an analogue-to-digital (A to D) converter 1 to provide a corresponding 8-bit digital value representative of the optical power. In FIG. 3 all the connections denoted 8 indicate that they represent 8-bit digital connections. Typically the optical power will be measured by tapping a known proportion (a few %) of the total optical power output by the modulator. This 8-bit digital representation is successively clocked into two serially connected latches 2, 3. As a result the value, A, held in latch 2 represents the current measured optical power whereas the value, B, held in latch 3 represents the optical power for the previous value of the control voltage V. These digital values A, B are applied to magnitude comparing logic 4. The magnitude comparing logic 4 has three output lines respectively for the following conditions A>B, A=B, and A<B. The respective output line is set to a high state (logic "1") in accordance with the comparison of the values of A and B. The output lines are used to "steer" a controller block 5 which in turn is used to control an up/down counter 6. The count of the counter 6 is an 8-bit digital value representative of the current value of the control voltage V. This digital value is converted to an analogue voltage by a digital-to-analogue converter 7 (D to A) whose output is analogue voltage V. This control voltage is used to bias the MZ device (not shown). The up/down counter 6 and its associated D to A converter 7 need to operate on "signed" values since the control voltage V has to swing to both negative and positive values. Accordingly two's complement arithmetic is required here.

At the start of each "search" the up/down counter 6 is reset. During calibration the counter counts (up or down) until the maximum and minimum values of optical power P are reached. The counts (which correspond to $V_0+V_\infty$)

corresponding to the maximum and minimum values of optical power are stored in latches 9 and 10 respectively. After the counts corresponding to the maximum and minimum optical output have been determined the two values are added together by an adder block 11 to produce a 9-bit sum. The least significant bit of the sum discarded such that the resulting 8-bit value represents the mean of the two counts (i.e. corresponds to $(V_0+V_\infty)/2$). This value is then loaded into the up/down counter 6 thereby setting the control voltage V to its mid-slope value. At this point the calibration process is complete and the controller 5 set a line denoted "done" to a high state indicating that the calibration process and to initiate control of the optical modulator by a conventional control loop. The controller 5 also determines the polarity of the slope of the portion of the voltage/optical power characteristic at which the modulator has been set which is used by the conventional control loop during operation of the modulator. Once the calibration circuit has determined the slope polarity and a suitable starting point (control voltage), its operation is disabled and the conventional control loop is switched in.

When the calibration process is not active the conventional control loop is used to maintain the value of the control voltage V. Since such arrangement are known and well documented they are not further described here.

It will be appreciated that when it is intended to use the MZ device to modulate optical radiation from a laser with high-speed digital data, that the modulation drive is disabled during the calibration process.

It will be further appreciated that modification can be made to the specific embodiment described which are still within the scope of the invention. For example additional sophistication can be added to the circuit to provide more accurate results to take account of noise and irregularities of the MZ device V-P characteristic. These can include for example:

measuring several samples of P (at the same value of V) and using their average;

measuring several samples of P (at incrementally different values of V) and using their average;

repeating the entire calibration process more than once and using an average of the findings ($V_0$ and $V_\infty$); or performing a combination of the above.

Further whilst in the foregoing the circuit has been described in relation to a MZ interferometer the circuit and method of the present invention can be applied to other types of voltage controllable optical components especially those having a voltage/optical characteristic which is periodic in character.

What is claimed is:

1. An apparatus for setting an operating voltage for a voltage controllable optical component having a periodic voltage/optical parameter characteristic, the apparatus comprising:
   a) means for setting the voltage applied to the component to a predetermined initial value;
   b) means for measuring the optical parameter;
   c) means for sequentially progressively increasing and decreasing the voltage with respect to the predetermined initial value, and means for determining respective maximum and minimum voltage values which produce maximum and minimum values of the optical parameter;
   d) means for determining a sense of a slope of a portion of the periodic characteristic lying between the maximum and minimum values; and
   e) the setting means being operable to set the voltage to a value intermediate the maximum and minimum voltage values.

2. The apparatus according to claim 1, in which, when the optical component is used in a communications system to convey communications traffic, the apparatus further comprises means for detecting an absence of the communications traffic and, in response to the detection of the absence of traffic, for causing the apparatus to set the operating voltage of the optical component.

3. The apparatus according to claim 1, in which the voltage controllable optical component is an optical modulator, and in which the optical parameter is one of optical attenuation and optical power.

4. The apparatus according to claim 1, in which the voltage controllable optical component is a Mach-Zehnder interferometer.

5. The apparatus according to claim 4, in which the Mach-Zehnder interferometer is a lithium niobate interferometer.

6. A communications system incorporating an apparatus for setting an operating voltage for a voltage controllable optical component having a periodic voltage/optical parameter characteristic, the apparatus comprising:
   a) means for setting the voltage applied to the component to a predetermined initial value;
   b) means for measuring the optical parameter;
   c) means for sequentially progressively increasing and decreasing the voltage with respect to the predetermined initial value, and means for determining respective maximum and minimum voltage values which produce maximum and minimum values of the optical parameter;
   d) means for determining a sense of a slope of a portion of the periodic characteristic lying between the maximum and minimum values; and
   e) the setting means being operable to set the voltage to a value intermediate the maximum and minimum voltage values.

7. A method of setting an operating voltage for a voltage controllable optical component having a periodic voltage/optical parameter characteristic, the method comprising the steps of:
   a) setting a voltage applied to the component to a predetermined initial value;
   b) measuring the optical parameter;
   c) sequentially progressively increasing and decreasing the voltage with respect to the predetermined initial value, and determining respective maximum and minimum voltage values which produce maximum and minimum values of the optical parameter;
   d) determining a sense of a slope of a portion of the periodic characteristic lying between the maximum and minimum values; and
   e) setting the voltage to a value intermediate the maximum and minimum voltage values.

8. The method according to claim 7, in which, when the optical component is used in a communications system to convey communications traffic, the method further comprises the steps of detecting an absence of the communications traffic and, in response to the detection of the absence of traffic, setting the operating voltage of the optical component.

9. The method according to claim 7, in which the voltage controllable optical component is an optical modulator, and in which the optical parameter is one of optical attenuation and optical power.

10. The method according to claim 7, in which the voltage controllable optical component is a Mach-Zehnder interferometer.

11. The method according to claim 10, in which the Mach-Zehnder interferometer is a lithium niobate interferometer.

* * * * *